United States Patent
Yuan et al.

(10) Patent No.: US 10,885,084 B2
(45) Date of Patent: Jan. 5, 2021

(54) TEXT MESSAGE PROCESSING

(71) Applicant: Alibaba Group Holding Limited, Grand Cayman (KY)

(72) Inventors: Zhijun Yuan, Hangzhou (CN); Fan Wu, Zhejiang (CN)

(73) Assignee: Alibaba Group Holding Limited, Grand Cayman (KY)

( * ) Notice: Subject to any disclaimer, the term of this patent is extended or adjusted under 35 U.S.C. 154(b) by 931 days.

(21) Appl. No.: 15/469,133

(22) Filed: Mar. 24, 2017

(65) Prior Publication Data
US 2017/0199931 A1 Jul. 13, 2017

Related U.S. Application Data

(63) Continuation of application No. PCT/CN2015/089111, filed on Sep. 8, 2015.

(30) Foreign Application Priority Data

Sep. 25, 2014 (CN) .......................... 2014 1 0500057

(51) Int. Cl.
*G06F 16/00* (2019.01)
*G06F 16/338* (2019.01)
(Continued)

(52) U.S. Cl.
CPC ............ *G06F 16/338* (2019.01); *G06F 16/33* (2019.01); *G06F 40/186* (2020.01);
(Continued)

(58) Field of Classification Search
CPC ..... G06Q 10/107; G06F 16/33; G06F 16/338; G06F 40/186; Y02D 10/45
See application file for complete search history.

(56) References Cited

U.S. PATENT DOCUMENTS

2011/0099040 A1* 4/2011 Felt .................... G06Q 10/0631
  705/7.12
2012/0166554 A1 6/2012 Preece
(Continued)

FOREIGN PATENT DOCUMENTS

| CN | 103220643 | 7/2013 |
| CN | 103543902 | 1/2014 |
| CN | 104038627 | 9/2014 |

OTHER PUBLICATIONS

Skarica et al., Implementation and Evaluation of Mobile Ticket Validation Systems for Value-Added Services, IEEE, SoftCOM 2009—17 International Conference on Software, Telecommunications & Computer Networks, Sep. 24-26, 2009, pp. 1-5. (Year: 2009).*

(Continued)

*Primary Examiner* — Cheryl Lewis
(74) *Attorney, Agent, or Firm* — Lee & Hayes, P.C.

(57) ABSTRACT

Upon receipt of a message including text content, matching is performed using a preset activity matching template. If the matching is successful, an activity card of a corresponding activity type is generated, and a related service application is displayed when the activity card is displayed. The present disclosure enables a user to see various related activity cards only by entering a list of activities without manually searching for, from a great number of message including text contents, a message including text content relevant to an activity. Moreover, the present disclosure enables the user to see the most related service application only by displaying an activity card without searching for and downloading an associated application program and without manually searching for an application relevant to an activity from hundreds of applications at a mobile terminal.

20 Claims, 13 Drawing Sheets

(51) Int. Cl.
*G06F 16/33* (2019.01)
*G06Q 10/10* (2012.01)
*G06F 40/186* (2020.01)
*G06F 40/284* (2020.01)

(52) U.S. Cl.
CPC ......... *G06F 40/284* (2020.01); *G06Q 10/107* (2013.01); *Y02D 10/00* (2018.01)

(56) References Cited

U.S. PATENT DOCUMENTS

| | | | |
|---|---|---|---|
| 2013/0290040 A1* | 10/2013 | Perry | G06Q 10/02 |
| | | | 705/5 |
| 2014/0025573 A1* | 1/2014 | Keronen | G06Q 20/322 |
| | | | 705/41 |
| 2014/0129302 A1* | 5/2014 | Amin | G06Q 50/30 |
| | | | 705/13 |
| 2014/0225899 A1 | 8/2014 | Bekmambetov et al. | |
| 2015/0088769 A1* | 3/2015 | Saarinen | H04L 63/10 |
| | | | 705/317 |
| 2016/0110659 A1* | 4/2016 | Skeen | G06Q 10/02 |
| | | | 705/5 |
| 2019/0286694 A1* | 9/2019 | Karunamuni | G06Q 10/10 |

OTHER PUBLICATIONS

Translation of International Search Report from corresponding PCT application No. PCT/CN2015/089111 dated Nov. 26, 2015, 2 pages.
Translation of Written Opinion from corresponding PCT application No. PPCT/CN2015/089111 dated Nov. 26, 2015, 6 pages.

\* cited by examiner

TEXT MESSAGE PROCESSING

CROSS REFERENCE TO RELATED PATENT APPLICATIONS

This application claims priority to and is a continuation of PCT Patent Application No. PCT/CN2015/089111, filed on 8 Sep. 2015, which claims priority to Chinese Patent Application No. 201410500057.8, filed on 25 Sep. 2014, entitled "TEXT MESSAGE PROCESSING METHOD AND SYSTEM," which are hereby incorporated by reference in their entirety.

TECHNICAL FIELD

The present disclosure relates to the field of mobile applications, and in particular, to a text message or a message including text content processing technology.

BACKGROUND

SMS is a main channel and means for a user to receive notifications. When the user uses various services, a service provider may often send service content in the form of an SMS to remind the user, and a notification SMS represents an activity to which the user needs to pay attention. However, it is not easy to search for and use an SMS in an ordinary text, and if the user further requires other related services, the user needs to find a corresponding application program according to SMS content on his/her own to meet the demand.

In conventional techniques, some operating systems are capable of automatically identifying telephone numbers, time and addresses in an SMS, and highlighting them.

However, the conventional techniques have the following disadvantages:

Only telephone numbers, time and addresses in a fixed format may be highlighted, and it is impossible to adjust an identification method and rule according to content of different SMSs. Only fixed services may be provided, such as clicking a telephone number to make a phone call quickly, and provided associated services are limited.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

An objective of the present application is to provide a message including text content processing method and a system thereof, so that a user may see cards of various related activities only by entering a list of activities, without searching for and downloading an associated application program.

In order to solve the foregoing technical problem, in embodiments of the present disclosure, a message including text content processing method is disclosed. At least one activity matching template is pre-stored. Each activity matching template includes an activity identification condition, an activity type, and a text analysis rule. A corresponding relationship between the activity type and an Internet-based service application is pre-stored. After a mobile terminal receives a message including text content, the following steps are performed:

determining whether the received message including text content meets the activity identification condition in one of the activity matching templates, and if yes, generating an activity card corresponding to the activity type in the activity matching template, and analyzing the message including text content with the text analysis rule in the activity matching template, to fill information obtained through analysis into the activity card;

querying the corresponding relationship according to the activity type of the activity card, to obtain a service application corresponding to the activity type; and displaying, when the activity card is displayed on the mobile terminal, the service application obtained through query.

In the embodiments of the present disclosure, a message including text content processing system is further disclosed. At least one activity matching template is pre-stored. Each activity matching template includes an activity identification condition, an activity type, and a text analysis rule. A corresponding relationship between the activity type and an Internet-based service application is pre-stored. After a mobile terminal receives a message including text content, the message including text content processing system includes the following modules:

an activity card generation and message analysis module configured to determine whether the received message including text content meets the activity identification condition in one of the activity matching templates, and if yes, generate an activity card corresponding to the activity type in the activity matching template, and analyze the message including text content with the text analysis rule in the activity matching template, to fill information obtained through analysis into the activity card;

a service application query module configured to query the corresponding relationship according to the activity type of the activity card, to obtain a service application corresponding to the activity type; and a display module configured to display, when the activity card is displayed on the mobile terminal, the service application obtained through query.

Compared with the conventional techniques, the embodiments of the present disclosure have the following main differences and effects:

With respect to a mobile terminal that may receive message including text contents from lots of senders, upon receipt of a message including text content, matching is performed with a preset activity matching template. If the matching is successful, an activity card of a corresponding activity type is generated, and a related service application is displayed when the activity card is displayed. This enables a user to see various related activity cards only by entering a list of activities without manually searching for, from a great number of message including text contents, a message including text content relevant to an activity that the user is to participate in. This also enables the user to see the most related service application only by displaying an activity card without searching for and downloading an associated application program and without manually searching for an application relevant to an activity from tens or even hundreds of applications in a mobile terminal. The time required by the user to perform related operations on the mobile terminal is shortened greatly, and the electric energy of the mobile terminal is saved.

Further, the service application is displayed according to a time axis during which an activity takes place, for example, and enables the user to see an associated service desired most in respective time periods during, before, and after the activity.

Further, the manner based on a time axis is supplemented, and the service application is adjusted in combination with time and a geographical position. This is more in line with an actual situation and avoids inconvenience brought about to the user due to an error such as flight delay or train delay.

Further, when a public number or content changes greatly, it is necessary to update the activity matching template, and the user does not need to manually update it as it is updated through an online update mechanism. This provides convenience for the user.

Further, for a situation where the number of message including text contents from a public number source is limited, in the present disclosure, a message including text content from a private number source is also analyzed to generate an activity card, and expands compatibility of the present disclosure.

Further, for a situation where information analyzed from the message including text content is insufficient, more perfect and more accurate data is acquired by querying a server corresponding to the activity type about supplementary information and by processing data of the activity card, thus providing a more accurate service for the user.

Further, information in the activity card is sent to a server of a service application, the user no longer needs to manually input activity-related information into the service application, and a result provided by the service application may be seen directly while the activity card is displayed.

Further, when a client needs to obtain a result of a service application, information in the activity card is sent to a server of the service application, a result returned by the server of the service application is received, and when the client does not need the result, corresponding sending and receiving are not performed, thereby reducing unnecessary transmission volume.

The present disclosure also provides one or more memories stored thereon computer-executable instructions that, when executed by one or more processors, cause the one or more processors to perform acts comprising:

determining that a message including text content meets an activity identification condition in an activity matching template;

generating an activity card corresponding to an activity type in the activity matching template;

analyzing the message including text content according to a text analysis rule in the activity matching template;

filling information obtained through analysis into the activity card;

querying a corresponding relationship between the activity type and a service application according to the activity type to obtain the service application corresponding to the activity type; and displaying the activity card and the service application at a mobile terminal.

The other acts may be referenced to the method and system embodiments.

DETAILED DESCRIPTION

Technical details are described in the following description for readers to better understand the present application. However, those of ordinary skill in the art should understand that the technical solutions of the present application may also be implemented even if in the absence of the technical details and various changes and modifications based on the following embodiments.

In order to make the objectives, technical solutions and advantages of the present disclosure clearer, the embodiments of the present disclosure are further described below in detail with reference to the accompanying drawings.

Figure 1:
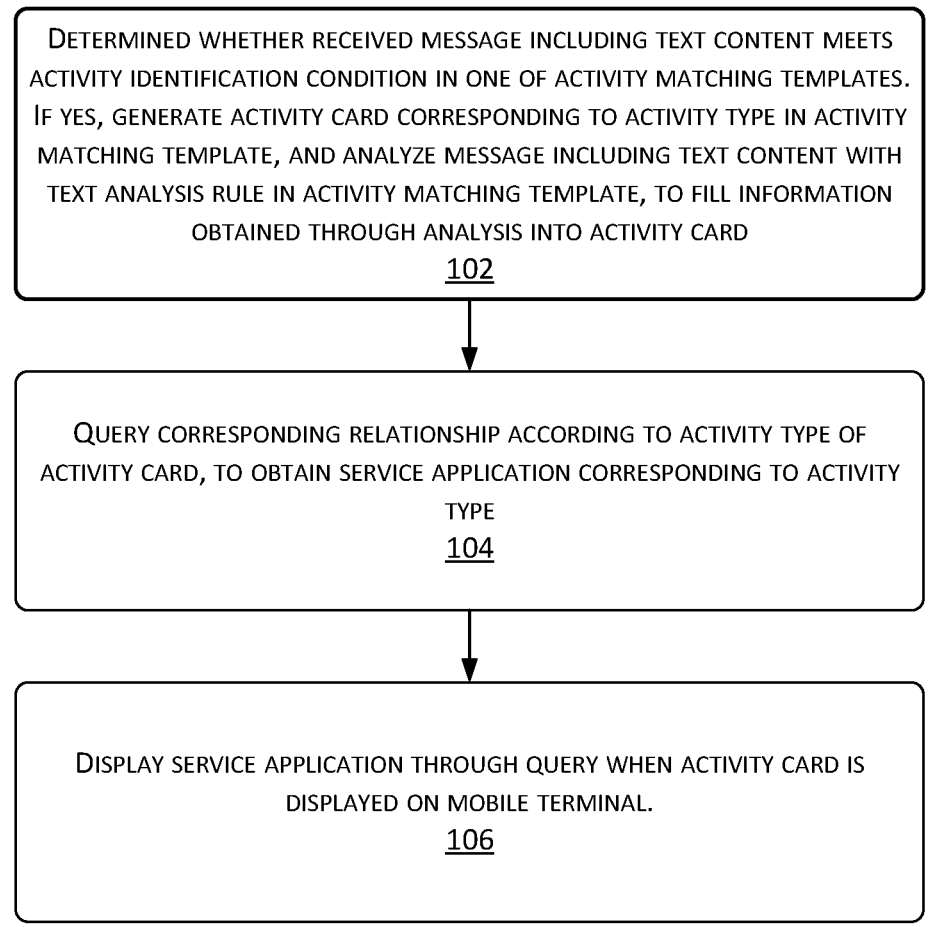
FIG. 1 is a schematic flow chart of a message including text content processing method according to a first embodiment of the present disclosure.

A first embodiment of the present disclosure relates to a message including text content processing method. FIG. 1 is a schematic flow chart of the message including text content processing method. Wherein at least one activity matching template is pre-stored, each activity matching template includes an activity identification condition, an activity type, and a text analysis rule, and a corresponding relationship between the activity type and an Internet-based service application is pre-stored. Specifically, as shown in FIG. 1, after a mobile terminal receives a message including text content, the following steps are performed:

Step 102. It is determined whether the received message including text content meets the activity identification condition in one of the activity matching templates. If yes, an activity card corresponding to the activity type in the activity matching template is generated, and the message including text content is analyzed with the text analysis rule in the activity matching template, to fill information obtained through analysis into the activity card.

The "message including text content" in the present application refers to a message carrier received on a user mobile device and containing text content, which may be an SMS, WeChat, an e-mail or the like.

For example, the source of the message including text content is not fixed. It may be understood that "the source of the message including text content is not fixed" in the present application refers to that the message including text content is not from one or more fixed sources, the source is a non-specific person, and it is likely to receive message including text contents from lots of senders (generally, it is impossible to predict which sender the next message including text content is from). For example, SMSs received by a cell phone may be from various numbers. The "source" in the present application refers to an initial sender, which may be a server and may also be a mobile terminal, but does not refer to a network node or server that plays a role of transfer.

The "activity card" in the present application is a visual expression of an information set, but is not a physical card. An activity card is a set of related information of a specific activity, for example, the activity card may include information such as an activity type, activity time, and an activity location. The "card" may organize the set of related information according to a certain data model (or referred to as a data format), and display the set of related information in an interface of a user terminal, thus displaying specific content of an activity event by using the card on the user terminal and carrying related interaction, for example, the card may be displayed based on a JavaScript Object Notation (JSON) format, and an optional card data model may be defined as follows:

```
{
"card_id"// card ID
"service_id"// ISV service ID
"ownerid"// owner of the card
"title"// title of the card
"content"// specific content of the card
"occurtime" // generation time of the card
"gmtexpired" // expiration time of the card
"location" // card location
"logourl" // logo image url of the card
}
```

The above is an example of a card data model. In an actual application, the card may be displayed by multiple data formats, and each field in the card may also be added, deleted, modified or the like according to content to be carried in the card.

In addition, it may be understood that, in each embodiment of the present disclosure, a sequence between the step of generating an activity card corresponding to the activity type in the activity matching template and the step of analyzing the message including text content with the text analysis rule in the activity matching template is not particularly limited, it is possible to first generate an activity card, analyze the message including text content, and then fill information obtained through analysis into the activity card, and it is also possible to first analyze the message including text content and then directly generate an activity card by using information obtained through analysis.

Then, proceed to step 104, in which the corresponding relationship is queried according to the activity type of the activity card, to obtain a service application corresponding to the activity type.

Then, proceed to step 106, in which the service application obtained through query is displayed when the activity card is displayed on the mobile terminal.

The above steps may all be completed at a mobile terminal, and may also be all completed at a server of a network side, and it is also possible that one part of the steps are completed at a mobile terminal and the other part of the steps are completed at a server of a network side.

According to this embodiment, for a mobile terminal that may receive message including text contents from lots of senders, upon receipt of a message including text content, matching is performed with a preset activity matching template, if the matching is successful, an activity card of a corresponding activity type is generated, and a related service application is displayed when the activity card is displayed. This enables a user to see various related activity cards only by entering a list of activities without manually searching for, from a great number of message including text contents, a message including text content relevant to an activity that the user is to participate in. This also enables the user to see the most related service application only by displaying an activity card without searching for and downloading an associated application program and without manually searching for an application relevant to an activity from tens or even hundreds of applications in a mobile terminal. The time required by the user to perform related operations on the mobile terminal is shortened greatly, and the electric energy of the mobile terminal is saved.

A second embodiment of the present disclosure relates to a message including text content processing method. The second embodiment makes improvements on the basis of the first embodiment, and the main improvements lie in: the service application is displayed according to a time axis before and after an activity takes place. This enables the user to, for example, see an associated service desired most in respective time periods before and after the activity; the manner based on a time axis is supplemented, and the service application is adjusted in combination with time and a geographical position. This is more in line with an actual situation and avoids inconvenience brought about to the user due to an error such as flight delay or train delay. Specifically:

The activity card includes a feature moment, and there may be one or more feature moments in the activity card, for example, start-up time of a train, departure and arrival time of a plane, starting time of a movie and so on. The feature moment may be obtained through analysis, and may also be obtained through query (for example, the arrival time found according to a flight number or the like).

The corresponding relationship includes a corresponding relationship between the activity type, a display time period, and the Internet-based service application, wherein the display time period is a relative value relative to the feature moment of the activity card. For example, if the activity type is a train ticket card and start-up time of a train is the feature moment of the activity card, a display time period of a taxi service application of arrival at a railway station may be set as 8 hours prior to the start-up time to 1 hour prior to the start-up, the display time period being a relative value relative to the feature moment of the activity card, that is, the start-up time of the train.

In an example, in the step 106 of displaying the service application obtained through query, the service application obtained through query is displayed according to a difference between a current moment and the feature moment in the activity card and a display time period of the service application in the corresponding relationship.

Generally, if a difference between a current moment and the feature moment in the activity card falls within a certain display time period, each service application corresponding to the display time period may be displayed.

In addition, it may be understood that, for example, when each service application is displayed in a different time period according to the time axis, multiple service applications may be displayed at the same time in a certain time period, for example, service applications of taxi and navigation are displayed at the same time.

However, in an actual application, an example display of the service applications arranged only according to time still has certain limitations. For example, due to weather or other reasons, flight delay is often encountered in daily life, and in this scenario, if a service application is provided for a user still according to estimated departure time and estimated arrival time of a flight, for example, providing the user with a food and beverage service application of a destination within the estimated arrival time is not effective, what the user needs more may be a food and beverage service of a place of departure.

With respect to this situation, in addition to controlling sorting and display of the service applications according to time, it is also necessary to take position information of the user into account.

In an example, the corresponding relationship includes a corresponding relationship between the activity type, a display time period, a display region, and the Internet-based service application, wherein the display time period is a relative value relative to the feature moment of the activity card.

In the step 106 of displaying the service application obtained through query, the service application obtained through query is displayed according to a difference between a current moment and the feature moment in the activity card, a current position, and a display time period and a display region of the service application in the corresponding relationship.

Generally, if a difference falls within a certain display time period and the current position falls within a certain display region, service applications corresponding to the display time period and the display region may be displayed.

Still by taking the flight delay as an example, in this scenario, the food and beverage service application of the destination is provided for the user not only according to the estimated arrival time of the flight, but also according to the current position of the user, if the flight delays, the current position of the user does not fall within the display region of the destination, and the food and beverage service application of the destination may not be displayed temporarily, but a service needed by the user is displayed correspondingly according to the current position.

In embodiments of the present disclosure, some service applications in the corresponding relationship are only limited by the display region but not by the display time period (or may be displayed in all the time periods).

A third embodiment of the present disclosure relates to a message including text content processing method. The third embodiment makes improvements on the basis of the first embodiment, and the main improvements lie in: when a public number or content changes greatly, it is necessary to update the activity matching template, and the user does not need to manually update it as it is updated through an online update mechanism, and provides convenience for the user; for a situation where the number of message including text contents from a public number source is limited, in the present disclosure, a message including text content from a private number source is also analyzed to generate an activity card, which expands compatibility of the present disclosure. Specifically:

In daily life, message including text contents received by a user are mainly classified into two types: the first type is from a public number source (e.g., train ticket SMSs from 12306, credit card SMSs from banks, air ticket SMSs from Qunar or the like), and sending numbers of such SMSs are relatively fixed and sending content is relatively uniform. The second type is from a private number source (e.g., SMSs from relatives, friends, and colleagues), and such SMS numbers are varied and content is not uniform. With respect to the above two situations, the present application performs different processing respectively.

When the message including text content is from a public number source, the activity identification condition is number source information (that is to say, the activity type of the message including text content may be determined through the number source; if the sending number is 12306, it may be determined that the activity is relevant to a train ticket). In an example, the number source information is an SMS sending number. In another example, the number source information is a sender ID of WeChat, QQ or Laiwang.

In the step 102:

It is determined whether the message including text content from the public number source meets the number source information in one activity matching template, and if yes, an activity card corresponding to the activity type in the activity matching template is generated, and the message including text content is analyzed with the text analysis rule in the activity matching template, to fill information obtained through analysis into the activity card.

Although the message including text contents and content of the public number source are relatively uniform, it is necessary to update the activity matching template when a public number or content changes greatly, and if the user needs to manually update the activity matching template, it may cause large disturbance to the user. In an example, a step of updating the activity matching plate is further included.

The step of updating the activity matching plate includes the following sub-steps of:

sending an update query request to a server terminal, using a locally buffered activity matching template if the request fails, and querying whether an activity matching template resource of the server terminal is updated if the request is successful; and receiving and buffering the latest activity matching template resource transmitted by the server terminal if the activity matching template resource of the server terminal is updated, and continuing to use a locally buffered resource if the activity matching template resource of the server terminal is not updated.

The user does not need to manually update the activity matching template as it is updated through an online update mechanism, thus providing convenience.

When the message including text content is from a private number source, the activity identification condition includes time and/or location information (that is to say, if the message including text content from a private number source includes specific time and location, it indicates that a corresponding activity takes place in designated time and location, such as a meeting, and a dinner party), and in the step 102:

it is determined whether the message including text content from the private number source includes time and location information, and if yes, an activity card of a user-defined activity type is generated, and the message including text content is analyzed with a text analysis rule in a universal activity matching template, to fill information obtained through analysis into the activity card.

In addition, it may be understood that, if the message including text content includes specific time and location, it indicates that a corresponding activity takes place in designated time and location. The universal activity matching template is mainly used to analyze time and location in the message including text content from the private number source, extract them to make up an activity card, and let the user self-define an activity theme through interaction.

In an example, in the step of analytically matching the message including text content with a universal activity matching template and generating an activity card of a user-defined activity type, the analytical matching includes address matching and/or time matching.

Wherein the address matching includes the following sub-steps of:

extracting geographical indication information included in the message including text content by using a regular expression;

performing, if the geographical indication information lacks a prefix of a first geographical indication, word segmentation through a lexicon of common geographical names; and taking, if the word segmentation is successful, the maximum word segment adjacent to the first geographical indication as a prefix, and searching forward, if the word segmentation fails, from the first geographical indication till a first non-Chinese character is searched.

Wherein the time matching includes the following sub-steps of:

unifying Chinese numerals and Arabic numerals as corresponding Arabic numerals through character replacement;

extracting a date through the regular expression, the date includes an absolute date and a relative date; and extracting a specific time through the regular expression.

In addition, it may be understood that the absolute date refers to such a manner of expressing time as Aug. 19, 2014, while the relative date refers to such a manner of expressing time as tomorrow or in the morning the day after tomorrow.

A fourth embodiment of the present disclosure relates to a message including text content processing method. The fourth embodiment makes improvements on the basis of the first embodiment, and the main improvements lie in: for a situation where information analyzed from the message including text content is insufficient, more perfect and more accurate data is acquired by querying a server corresponding to the activity type about supplementary information and by processing data of the activity card, thus providing a more accurate service for the user. Specifically:

Firstly, a step of receiving the message including text content is further included.

The step of receiving the message including text content includes the following sub-steps of:

monitoring a broadcast with message including text content content automatically sent when an operating system receives a new message including text content; receiving the message including text content if the broadcast is monitored; and continuing the monitoring if the broadcast is not monitored.

Secondly, after the step of generating an activity card corresponding to the activity type in the activity matching template, and analyzing the message including text content with the text analysis rule in the activity matching template, the method further includes a step of:

sending information obtained through analysis to a server corresponding to the activity type, and receiving activity card supplementary information returned by the server.

In the step of filling information obtained through analysis into the activity card, the activity card supplementary information and the information obtained through analysis are together filled into the activity card, to perform data processing on the activity card.

In addition, it may be understood that, in the case of a train ticket activity card, a destination of a user may not be acquired from a message including text content, which only includes the user's place of departure and train number, and in this way, a more accurate service about the destination may not be provided for the user. In the case of a movie ticket activity card, only a movie title may be acquired from the message including text content, but a movie poster may not be acquired, which may not give the user a better visual experience.

For a situation where information obtained through analysis of the message including text content is insufficient, more perfect and more accurate data is acquired by querying a server corresponding to the activity type about supplementary information and by processing data of the activity card, thus providing a more accurate service for the user.

A fifth embodiment of the present disclosure relates to a message including text content processing method. The fifth embodiment makes improvements on the basis of the first embodiment, and the main improvements lie in: information in the activity card is sent to a server of a service application, the user no longer needs to manually input activity-related information into the service application, and a result provided by the service application may be seen directly while the activity card is displayed; when a client needs to obtain a result of a service application, information in the activity card is sent to a server of the service application, a result returned by the server of the service application is received, and when the client does not need the result, corresponding sending and receiving are not performed, thereby reducing unnecessary transmission volume. Specifically:

In an example, before the step of displaying the service application obtained through query, the method further includes the following step of:

sending information in the activity card to a server of the service application, and receiving a result returned by the server of the service application; and in the step of displaying the service application obtained through query, the result returned by the server of the service application is displayed on the mobile terminal.

In addition, it may be understood that an example of the service application may be an application of weather forecast of a destination, and a result provided by the service application is specific weather forecast of the destination.

For example, before an application of weather forecast of a destination of a train ticket is displayed, train number information of the train ticket is sent to a server of a weather service application, specific weather forecast of the destination returned by the server of the weather service application is received, and the specific weather forecast is displayed on a mobile terminal; therefore, the user no longer needs to manually input activity-related information to the weather forecast application, and specific weather forecast may be seen directly while the activity card is displayed.

In an example, after the step of displaying the service application obtained through query, the method further includes the following step of:

sending, when a button of the service application is clicked, the information in the activity card to the server of the service application, and receiving the result returned by the server of the service application, to display the result on the mobile terminal.

In the example manner, only a related service application is displayed, and the result returned by the server of the service application is not directly displayed. Only when the button of the service application is clicked (that is, when a client needs to obtain the result of the service application), may information in the activity card be sent to the server of the service application and the result returned by the server of the service application be received, to display the result on the mobile terminal; and when the client does not need the result, corresponding sending and receiving are not performed, thereby reducing unnecessary transmission volume.

Figure 2:
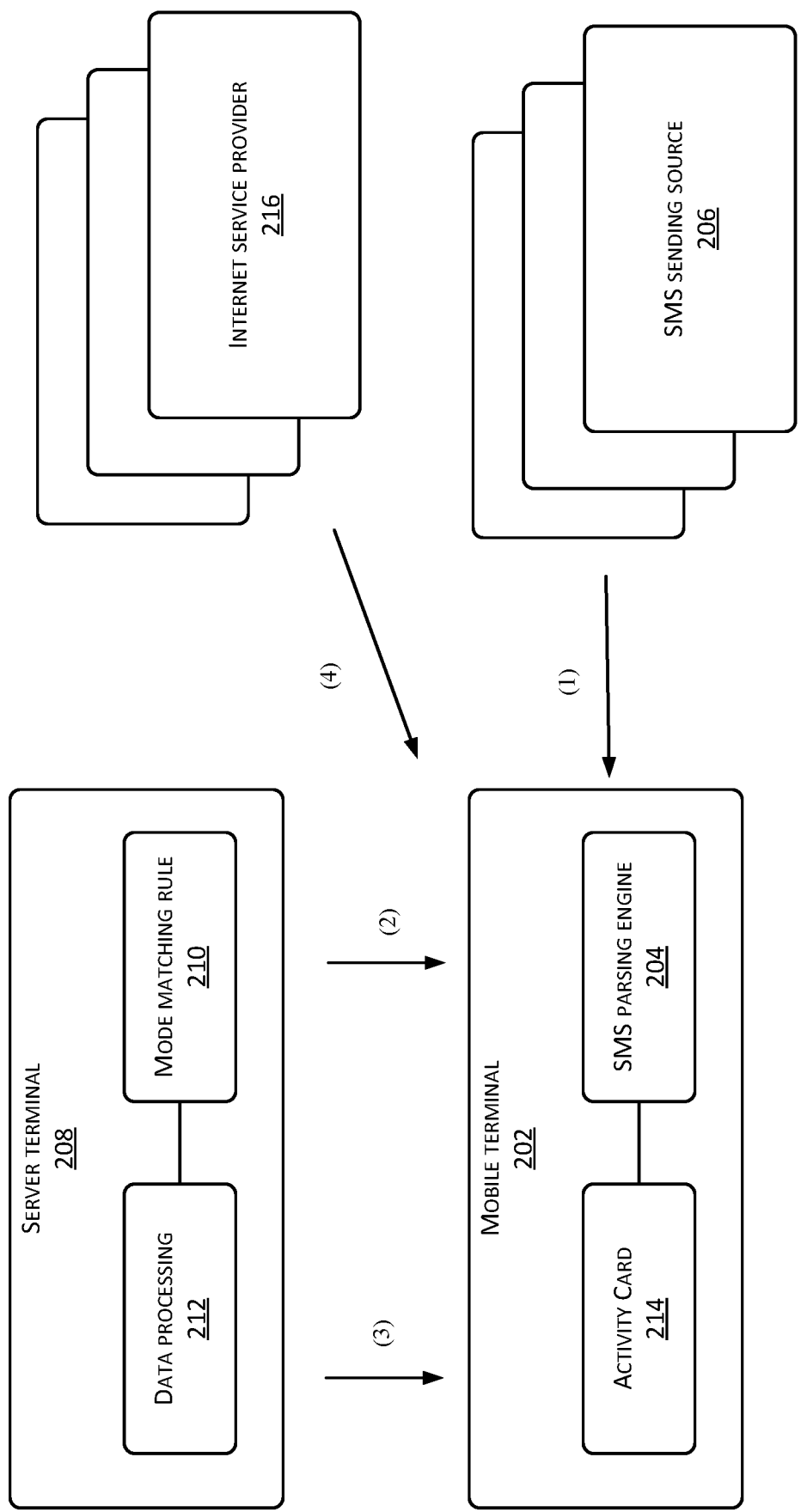
FIG. 2 is a schematic flow chart of operation of an example of a message including text content processing method according to a fifth embodiment of the present disclosure.

As an example of the present disclosure, an SMS is used as a basic information input source of an activity, an SMS receiving unit is implanted on a mobile device based on an SMS receiving mechanism in a mobile system, and through an online updatable mode matching rule (that is, activity matching template), SMS content is analyzed, and an unstructured ordinary text is converted to structured data of a corresponding type, converted to a structured activity with complete information through a content completion mechanism, and is displayed to the user in a card mode. A third-party service provider may publish, based on various types of activities, services associated with the activities, and the system automatically pushes the services to the user for use in a manner of a time axis. A flow chart of operation in an example is as shown in FIG. 2, and four steps included in an implementation process are respectively:

1) A mobile terminal 202 with an SMS parsing engine 204 receives an SMS from an SMS sending source 206;

2) A server terminal 208 analyzes content of the SMS according to a mode matching rule 210 through data processing 212;

3) The mobile terminal 202 generates an activity card 214 or receive the activity card 214 from the server terminal 206; and 4) An Internet service provider 216 generates an associated service for the activity card 214 based on a time axis.

The above implementation process is further described below in detail.

1) Receive an SMS of an SMS Sending Source

Figure 3:
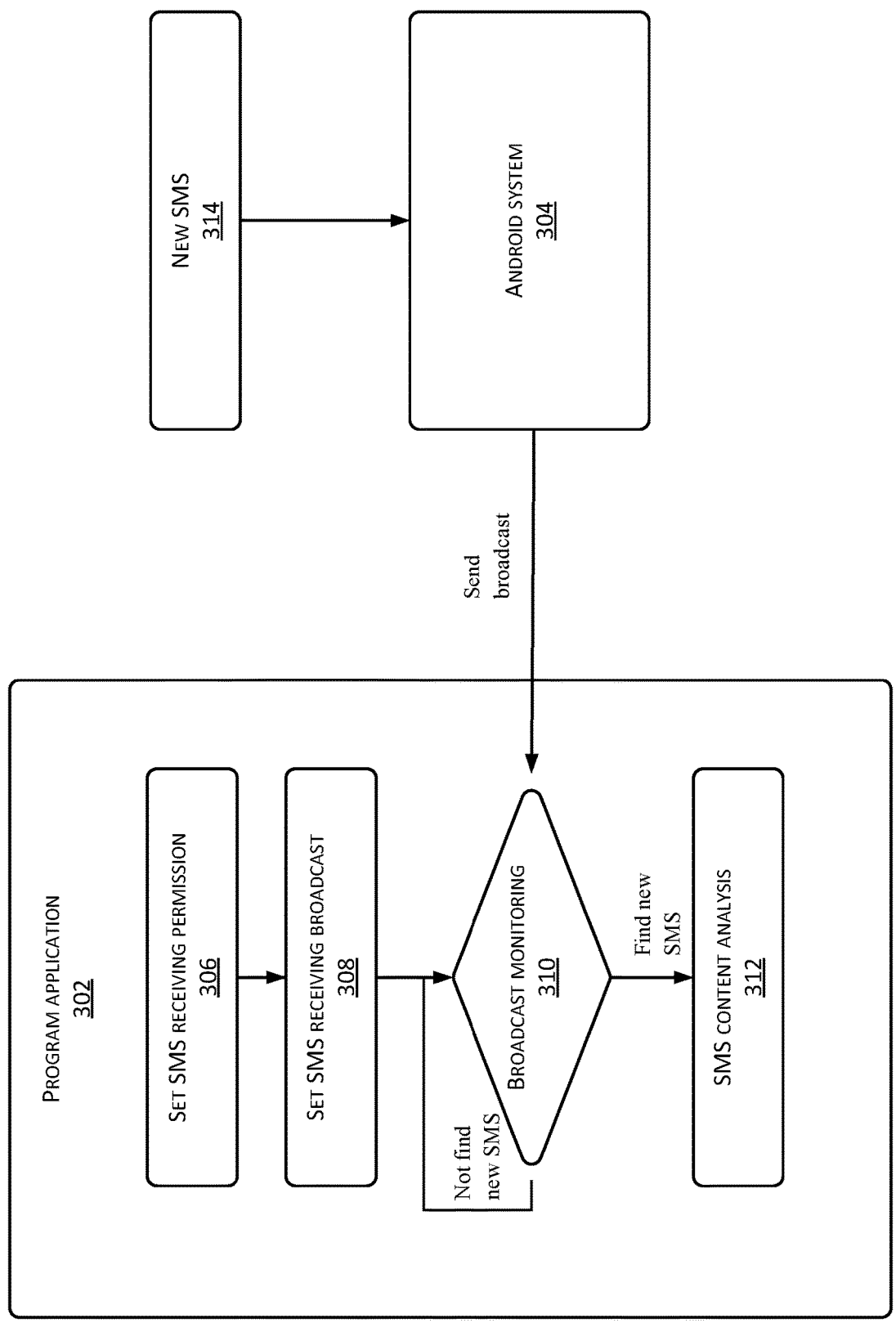
FIG. 3 is a schematic flow chart showing that an application program in an Android platform receives an SMS in an example of the message including text content processing method according to the fifth embodiment of the present disclosure.

This example embodiment is mainly used for automatically converting an SMS to a time-axis based activity, and thus how to acquire an SMS of a mobile terminal is the first step of this example embodiment. As different mobile terminals have different operating systems, manners of acquiring SMSs are also different. An SMS receiving method is now introduced by taking an Android platform as an example. An application program under the Android platform receives an SMS mainly in two steps: one is acquiring user authorization, and the other is setting San SMS receiving broadcast. A schematic flow chart of exemplary receiving an SM by a program application 302 under an Android platform 304 is as shown in FIG. 3.

User Authorization. At 306, SMS Receiving Permission is Set.

As SMS content and number involves user privacy, in some systems, they may be used only when a user-authorized SMS content access permission is obtained, and the user authorization is mainly embodied in two aspects:

1. The User Authorizes the Program Application 302 to Access an SMS Center

The present disclosure needs to access user SMS content and an SMS source number, and the user needs to authorize the program application 302 with a permission of accessing SMSs from a user mobile terminal.

2. The User Accepts a Protocol of Use for the Program Application 302.

The present disclosure may clearly indicate in a protocol of use that the program application 302 may access SMSs from a user mobile terminal, and the user may use the program application 302 after accepting the protocol of use.

At 308, an SM Receiving Broadcast is Set.

The program application 302 under the Android platform 304 receives a system SMS according to the following process: the program application 302 first needs to set an SMS receiving permission and then sets an SMS receiving broadcast. When the Android system 304 receives a new SMS, a broadcast with SMS content may be sent automatically, and at this point, the program application 302 monitors 310 the broadcast, extracts the SMS in the broadcast, and analyzes 312 the SMS content. The whole process is repeated when the Android system 304 receives a new SMS 314.

2) Analyze Content of the SMS According to a Mode Matching Rule

An SMS (including SMS content and a sending number) in the system may be acquired through the SMS receiving in the first step. An objective of the present disclosure is to convert an SMS to a time-axis based activity, and thus it is necessary to analyze content of the SMS to generate a corresponding activity. In daily life, SMSs received by a user are mainly classified into two types: the first type is SMSs from a public number source (e.g., train ticket SMSs from 12306, credit card SMSs from banks, air ticket SMSs from Qunar or the like), and sending numbers of such SMSs are relatively fixed and sending content is relatively uniform. The second type is SMSs from a private number source (e.g., SMSs from relatives, friends, and colleagues), and such SMS numbers are varied and content is not uniform. With respect to the above two situations, the present application proposes two different analysis rules: an online update mode matching rule and a universal mode matching rule (activity matching template).

Online Update Mode Matching Rule

Figure 4:
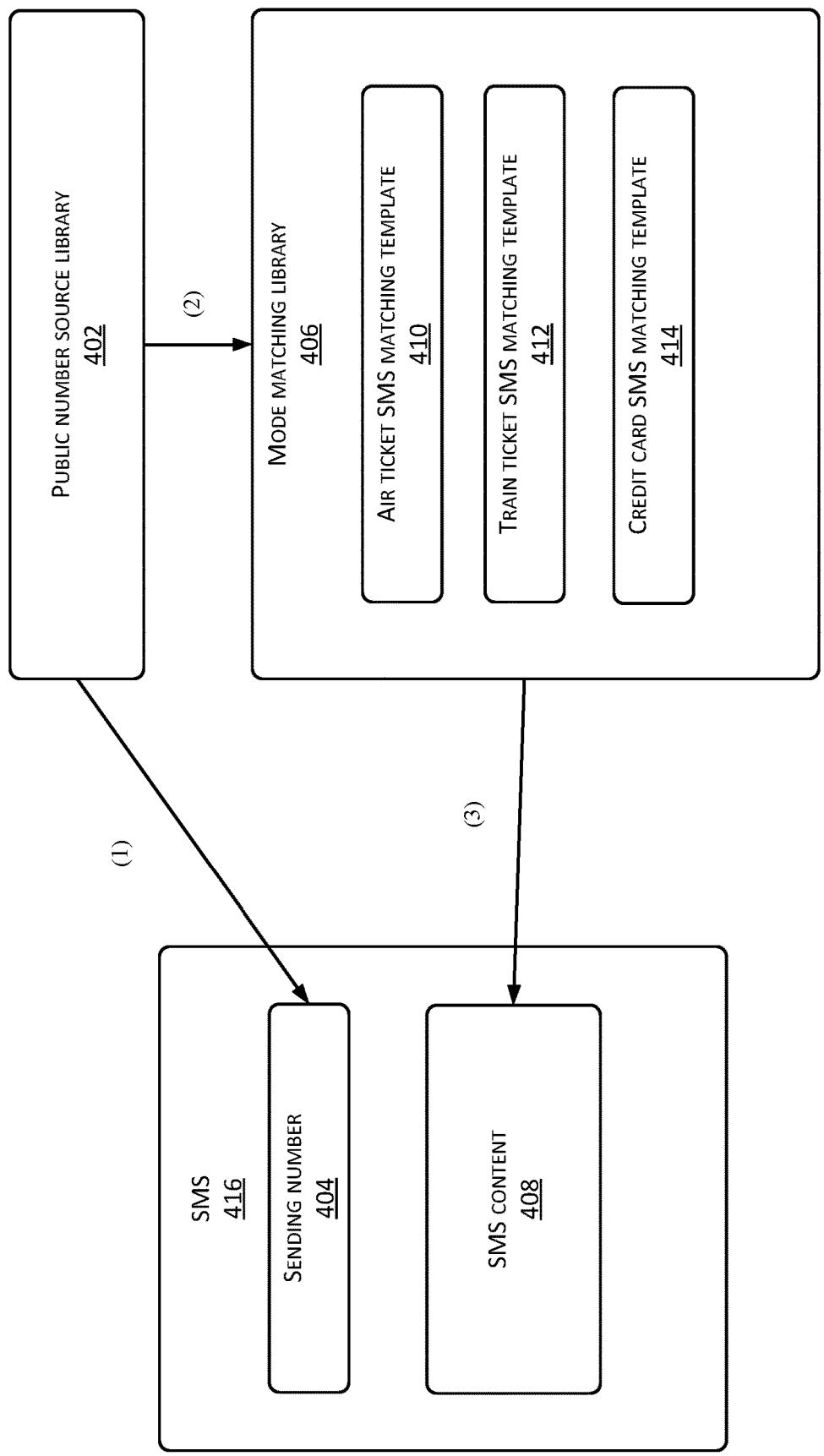
FIG. 4 is a schematic flow chart of analysis of a message including text content from a public number source in an example of the message including text content processing method according to the fifth embodiment of the present disclosure.

The rule is suitable for SMSs sent from a public number source. Sending numbers of such SMSs are relatively fixed and sending content is relatively uniform. An activity type of an SMS may be determined through the number source (for example, if the sending number is 12306, it may be determined that the activity is related to a train ticket), and after the activity type is determined, detailed information of the activity may be extracted by using a train ticket template constructed through a common train ticket SMS format (for example, start-up time, train number and the like of the train ticket are extracted). The present disclosure sets different matching templates for different number sources. A schematic flow chart of analysis of a message including text content from a public number source is as shown in FIG. 4:

1. A public number source library 402 acquires and filters SMS sending number 404 to determine an SMS number source;

2. The public number source library 402 transfers number source information to a mode matching library 406 which selects a matching template according to the number source. For example, the matching templates may include an air ticket SMS matching template 410, a train ticket SMS matching template 412, and a credit card SMS matching template 414; and 3. SMS content 408 is transferred to the selected matching template for matching, SMS content 408 of a public number source is relatively uniform, and the present disclosure constructs a number source matching template by extracting SMS features of the same number source. Both the sending number 404 and the SMS content 408 are part of an SMS 416.

Figure 5:
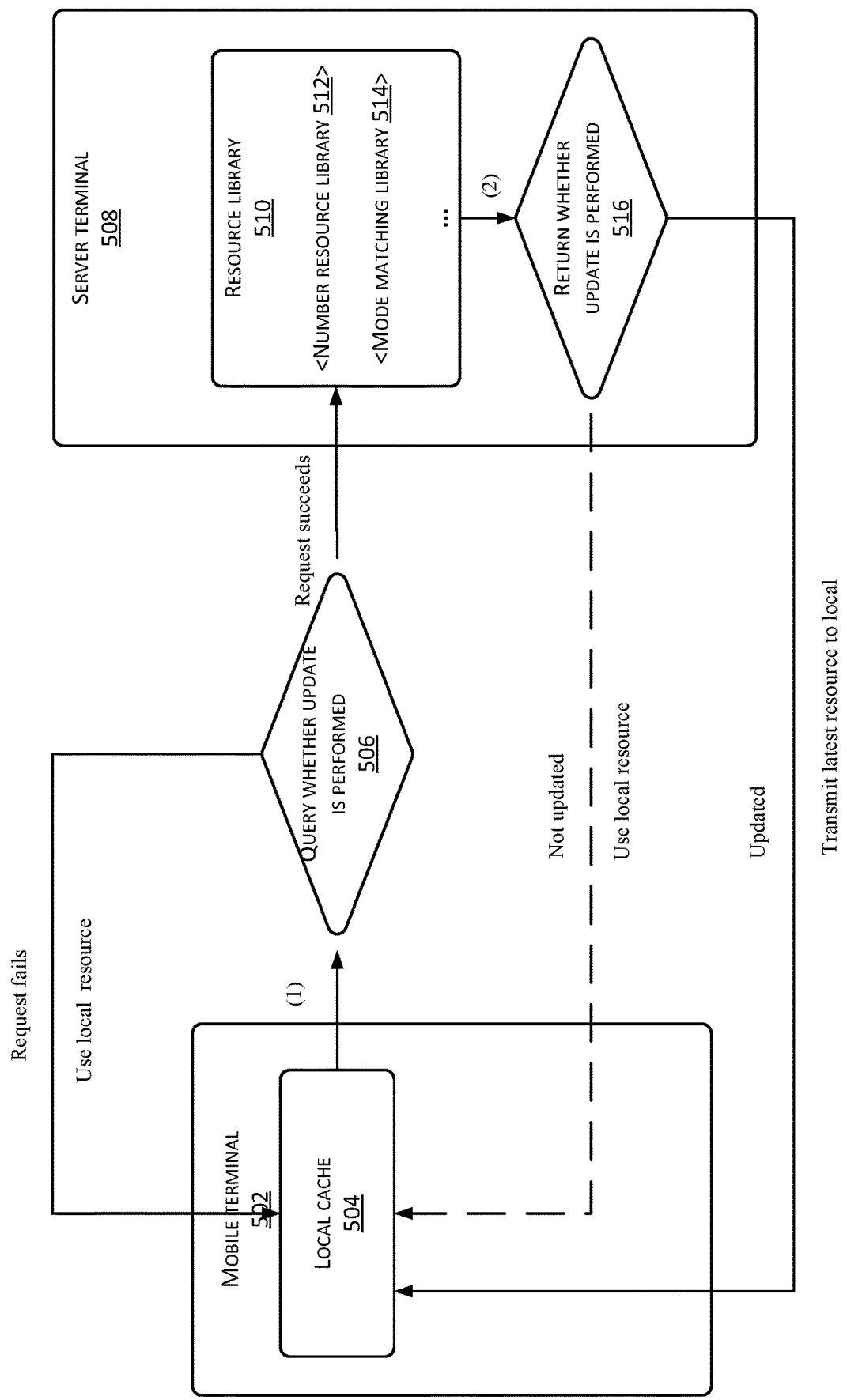
FIG. 5 is a schematic flow chart of updating of an activity matching template in an example of the message including text content processing method according to the fifth embodiment of the present disclosure.

Although SMSs and content of the public number source are relatively uniform, when the number or content changes greatly, it is necessary to update the mode matching library, and the user also needs to manually update it, which causes large disturbance to the user. In order to be compatible with this situation, the present disclosure proposes an online update mechanism, a number source library and an SMS matching template are independently extracted to a resource library at a server terminal, and a mobile terminal determines through an update check request whether automatic update is necessary. A schematic flow chart of exemplary updating of an activity matching template is as shown in FIG. 5:

1. When a mobile terminal 502 uses the techniques of the present disclosure, an update query request that queries whether update is performed 506 may be sent from a local cache 504 to a server terminal 508. If the request fails (such as the server is closed or there is no available network in a current environment), a local resource is used. If the request is successful, it is queried whether a resource library 510 of the server terminal 508 is updated. The resource library, for example, includes a number source library 512, a mode matching library 514.

2. The server terminal 508 returns 516 whether update is performed to the mobile terminal 502. The server terminal 508 checks an update condition of the resource library 510, and transmits the latest resource of the server terminal 508 to the mobile terminal 502 if the resource library is updated, and the mobile terminal 502 continues to use the local resource if the resource library 510 is not updated.

Universal Mode Matching Rule (Time+Location)

Figure 6:
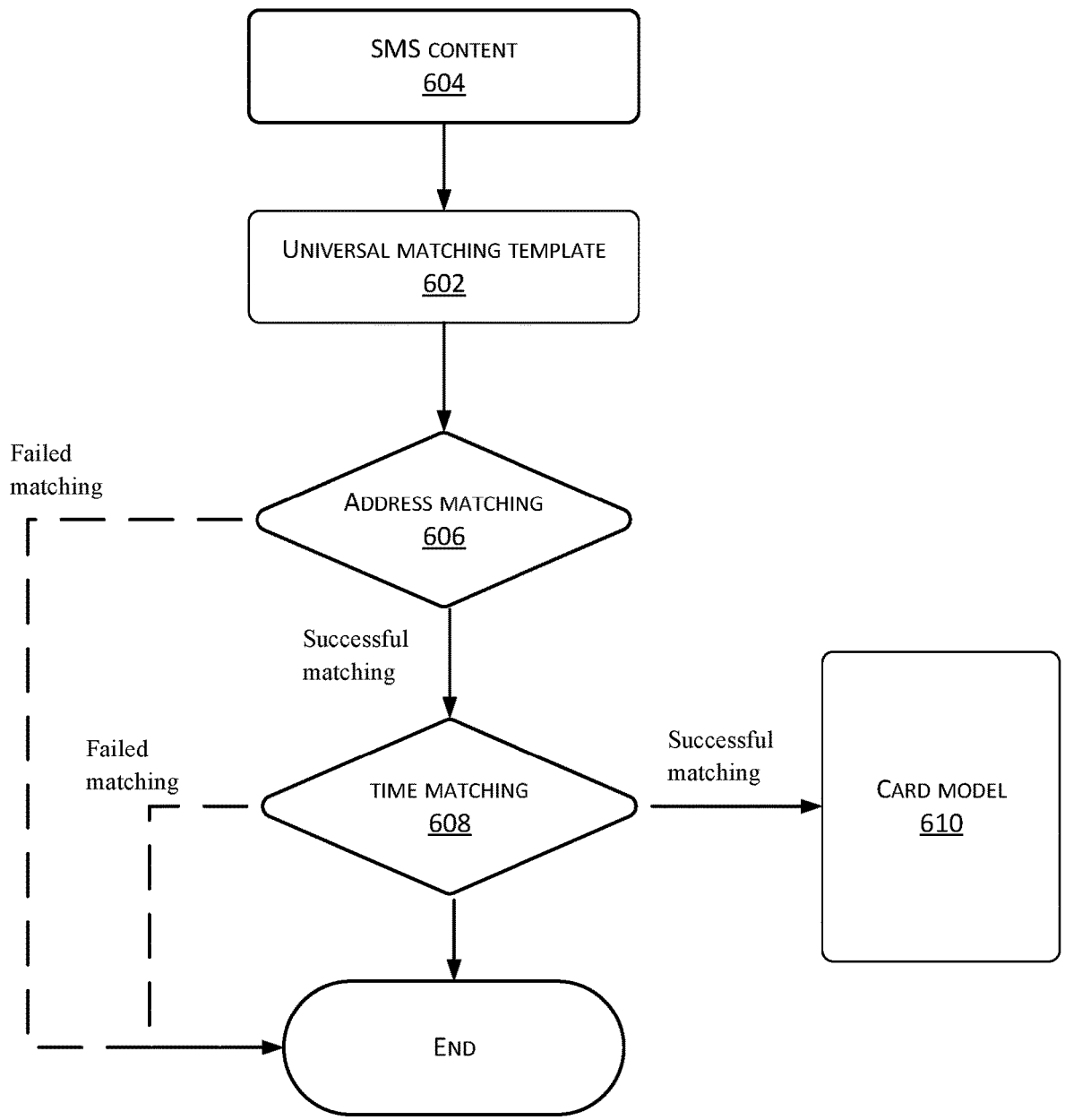
FIG. 6 is a schematic flow chart of analysis of a message including text content from a private number source in an example of the message including text content processing method according to the fifth embodiment of the present disclosure.

After all, the number of SMSs from the public number source is limited, and in order to expand compatibility of the present disclosure, the present disclosure proposes an SMS universal matching rule. If an SMS includes specific time and location, it indicates that a corresponding activity (meeting, a dinner party, or the like) takes place in the designated time and location. The universal matching rule is mainly used to analyze time and location in an SMS from a private number source, let the user self-define an activity theme through interaction, and extract them to make up a card model. A schematic flow chart of exemplary analysis of a message including text content from a private number source is as shown in FIG. 6:

1. A universal matching template 602 acquires SMS content 604 from a non-fixed number source for analytical matching, which is classified into address matching 606 and time matching 608. If the address matching 606 is successful, the time matching 608 is performed, and if the address matching fails, the process is ended; if the time matching is also successful, a card model 610 is generated according to a matching result, and if the time matching 608 is ended, the process is ended, wherein a sequence between the address matching 606 and the time matching 608 is not limited.

2. Address matching: for the address matching, the present disclosure first uses a regular expression to extract geographical indication (city, region, county, street and the like) information (e.g., number xx, xx road, xx region, city) included in an SMS, and at this point, the extracted information lacks a prefix of a first geographical indication, and in the above example, the name of the city may not be determined. Then, word segmentation is performed through a lexicon of common geographical names, if the word segmentation is successful (i.e., the prefix includes a common word), the maximum word segment adjacent to the first geographical indication is taken as a prefix, and if the word segmentation fails, the prefix is searched forward from the first geographical indication till a first non-Chinese character is searched (at most 6 characters are searched, and the first 6 characters are taken as a prefix if the number of characters exceeds 6).

3. Time matching: for the time matching, the present disclosure is compatible with Chinese and Arabic numerals mixed time matching (e.g., 8:00 tomorrow morning, half past nine on August twenty-seventh), firstly, Chinese numerals are replaced with corresponding Arabic numerals through character replacement (for example, 5 is replaced with five, and twenty-seven is replaced with 27), then a date is extracted through a regular expression (an absolute date, for example, 2014 Aug. 19 or Aug. 25, is extracted directly, and a relative date, for example, tomorrow or in the morning the day after tomorrow, is converted according to a current date), and finally, specific time (e.g., 8:00 or 9:30) is extracted through the regular expression.

Identified SMSs are, for Example, as Shown in the Following Table 1

TABLE 1

| Sending number | SMS content | Card model |
| --- | --- | --- |
| 12306 | (1/2) Order No.: E440674001, Hello, Ms. Li, you have bought a ticket of G7509, Carriage 04, No. 08C starting at 11:00 on June 27, to Shanghai Hongqiao. You may hold the second generation ID | Activity Type: train ticket card<br>Activity deadline: 11:00, June 27, 2014<br>Train No.: G7509<br>Seat No.: Carriage 04, No. 08c<br>Railway station: Shanghai Hongqiao |

TABLE 1-continued

| Sending number | SMS content | Card model |
|---|---|---|
| | [Railway customer service] (2/2) card to directly have your ticket checked and take the train or exchange a paper ticket and then take the train [Railway customer service] | |
| 106900073065286 | [The Cat's Meow] You have successfully purchased tickets. Please go to the cinema to collect the tickets from the UME self-service ticket machine with the authentication code 68136501 before the opening. 13:20, Saturday, June 21, UME International Cinema (West Town Plaza Branch) Edge of Tomorrow, Seat 07 Row D and Seat 08 Row D in No. 7 Hall, Cinema address: 4$^{th}$ Floor, West Town Plaza, No. 551 West Wen'er Road, Customer service hotline: 4006705335 | Activity Type: movie ticket card<br>Activity deadline: 13:20, June 21, 2014<br>Movie title: Edge of Tomorrow<br>Authentication code: 68126501<br>Seat: Seat 07 Row D and Seat 08 Row D in No. 7 Hall<br>Cinema name: TIME International Cinema (West Town Plaza Branch)<br>Cinema address: 4$^{th}$ Floor, West Town Plaza, No. 551 West Wen'er Road |
| 106980000762 | The air ticket of Flight CZ3191 (take off at 17:30/arrive at 21:00) from Shenzhen Bao'an Airport T3 to Beijing Capital Airport T2 on May 23, 2014 has been presented. Ticket No.: 7842131238231. Please check in at the airport two hours ahead. Tiantai Flights, Only Customer Service Telephone No.: 010-89677318. For order inquiry/refunding or ticket changing, please click http://d.qunar.com/Cri2Gf. [qunar.com] | Activity Type: air ticket card<br>Activity deadline: 17:30, May 23,2014<br>Airport terminal: Shenzhen Bao'an Airport T3<br>Departure city: Shenzhen<br>Arrival city: Beijing<br>Flight: CZ3191<br>Departure time: 17:30, May 23, 2014<br>Arrival time: 21:00, May 23, 2014 |
| Private number | Please come to the International Building in Xihu District to attend a meeting at 8:00 tomorrow morning. | Activity Type: universal card<br>Activity deadline: 08:30, August 20, 2014 (the current date is August 19, 2014)<br>Activity theme: meeting (user-defined)<br>Activity address: International Building in Xihu District |
| Private number | Have a team dinner party at 6 p.m. on August 21, Address: No. 969, Wenyi Road | Activity Type: universal card<br>Activity deadline: 18:00, August 21, 2014<br>Activity theme: dinner party (user-defined)<br>Activity address: No. 969, Wenyi Road |

3) Generate an Activity Card

A card model may be generated by analyzing card content in the previous step, but not all card models may generate a card (an activity card with complete information) directly. For example, in a train ticket card, a destination of a user may not be acquired from an SMS, which only includes the user's place of departure and train number, and in this way, a more accurate service about the destination may not be provided for the user; while in a movie ticket card, only a movie title may be acquired from an SMS, but a movie poster may not be acquired, which may not bring about a better visual experience to the user. Therefore, after a card model is generated, the present disclosure further processes data in the card model, to acquire more perfect and more accurate data.

Card Data Processing

Figure 7:
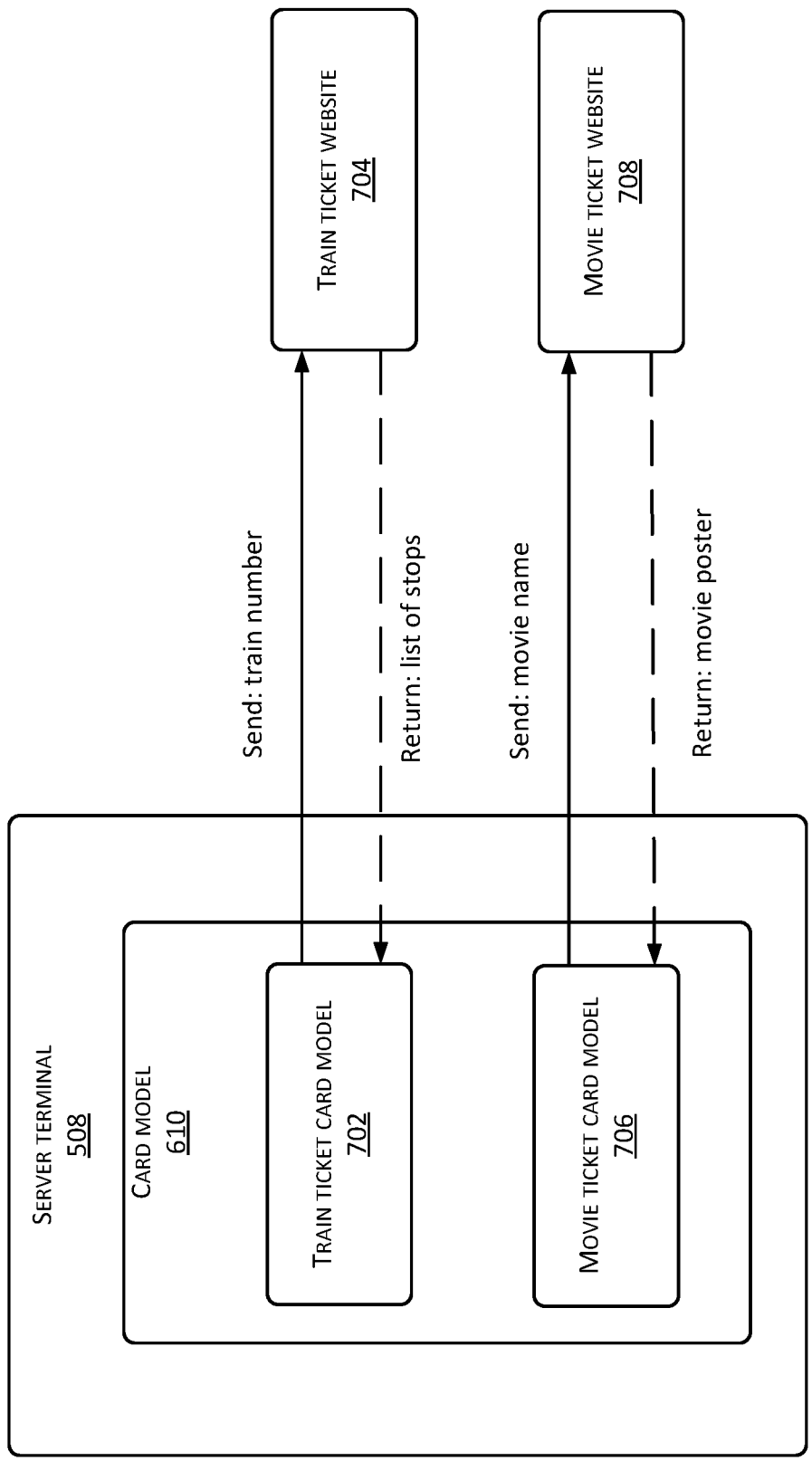
FIG. 7 is a schematic flow chart of data processing of an activity card by taking a train ticket card model and a movie ticket card model as an example in an example of the message including text content processing method according to the fifth embodiment of the present disclosure.

Card data processing is a measure taken for a situation where data in a card model generated through an SMS is insufficient. A schematic flow chart of data processing of a card by taking a train ticket card model and a movie ticket card model as an example is as shown in FIG. 7: train number information in the train ticket card model 702 is sent to a train ticket website 704, and the train ticket website 704 returns a list of stops; a movie title in the movie ticket card model 706 is sent to a movie ticket website 708, and the movie ticket website 708 returns a movie poster.

Data Processing of a Train Ticket Card

It is likely that a train ticket SMS may not provide a destination of a user, a generated card model lacks a destination, and a more accurate service such as arrival time prediction may not be provided for the user. Therefore, the present disclosure, through train number data in the train ticket card model, queries, at a server terminal, the train ticket website about stop information of the train number through train number information, and adds the stop information to the train ticket card model. The train ticket card model after data processing is as shown in the following Table 2:

TABLE 2

| Card model | Complete card data |
| --- | --- |
| Activity type: train ticket card | Activity type: train ticket card |
| Activity deadline: 11:27, June 27, 2014 | Activity deadline: 11:27, June 27, 2014 |
| Train number: G7509 | Train number: G7509 |
| Seat: No. 08c, Carriage 04 | Seat: No. 08c, Carriage 04 |
| Station: Shanghai Hongqiao | Station: Shanghai Hongqiao |
| | Stop information: 1. South Jiaxing; 2. Yuhang; 3. East Hangzhou; 4. North Shaoxing; 5. Ningbo |

Data Processing of a Movie Ticket Card

In a movie ticket SMS, a movie title may be acquired from the SMS, while a movie poster may bring about the most intuitive feeling for a movie to the user. Therefore, the present disclosure, through the movie title, requests, at the server terminal, a corresponding movie poster from a movie website, and returns the movie poster to the user, which brings about a better experience to the user. The movie ticket card model after data processing is as shown in the following Table 3:

TABLE 3

| Card model | Complete card data |
| --- | --- |
| Activity type: movie ticket card | Activity type: movie ticket card |
| Activity deadline: 12:20, June 21, 2014 | Activity deadline: 12:20, June 21, 2014 |
| Movie title: How to Train Your Dragon | Movie title: How to Train Your Dragon |
| Authentication code: 68126501 | Authentication code: 68126501 |
| Seat: Seat 07 Row D and Seat 08 Row D in No. 7 Hall | Seat: Seat 07 Row D and Seat 08 Row D in No. 7 Hall |
| Cinema name: UME International Cinema (West Town Plaza Branch) | Cinema name: UME International Cinema (West Town Plaza Branch) |
| | Cinema address: $4^{th}$ Floor, West Town Plaza, No. 551, West Wen'er Road |
| | Movie poster address: http://img5.gewara.com/cw210h280/images/movie/201407/ |

TABLE 3-continued

| Card model | Complete card data |
| --- | --- |
| Cinema address: $4^{th}$ Floor, West Town Plaza, No. 551, West Wen'er Road | s__70735d1b__14781bce91f__7e7d.jpg |

Figure 8:
FIG. 8 shows an example of four types of activity cards generated according to the present disclosure.

When the card models all acquire complete activity data, an activity card may be generated. FIG. 8 shows an example of four types of activity cards generated according to the present disclosure. As illustrated, train ticket and air ticket activity cards include destinations; and the movie ticket activity card includes a movie poster.

4) Generate, by an Internet Service Provider, an Associated Service for the Activity Card Based on a Time Axis Through the above steps, an SMS of an ordinary text may be automatically converted to structured card data with complete information, the card data may be classified according to predefined types, for example, a train ticket type, an air ticket type, a movie ticket and activity event type, and each type has a fixed data format and also represents a particular activity scenario. A third-party service provider may publish associated services based on the activity scenarios, and organize the associated services based on a time axis before and after the activity takes place, to meet the user's demand about the activity through card data and various associated services. By taking a train ticket as an example, based on a train ticket card data model, a weather service provider, a taxi service provider, a navigation service provider, a food and beverage service provider, a train ticket stop service provider, and a music service provider may respectively publish the following associated services:

weather service provider→destination weather forecasting service taxi service provider→taxi or taxi booking service of arriving at a railway station navigation service provider→navigation service of arriving at a railway station food and beverage service provider→food and beverage service near a railway station train ticket stop service provider→stop reminding service music service provider→offline music service The present disclosure may arrange associated services based on a time axis before and after the activity takes place, enable the user to first see an associated service most desired in various time periods before and after the activity takes place. By taking associated services of a train ticket as an example, time periods displayed by the services, for example, may be:

destination weather forecasting service: prior to 8 hours before a train starts taxi or taxi booking service of arriving at a railway station: 8 hours before a train starts to 1 hour before the train starts navigation service of arriving at a railway station: 8 hours before a train starts to 1 hour before the train starts food and beverage service near a railway station: 1 hour before a train starts to the time when the train starts stop reminding service: after a train starts offline music service: after a train starts Other types of cards are similar to the train ticket, each service provider, when publishing an associated service, needs to designate a time period referentially displayed by the service, and the present disclosure may control sorting and display of the associated service according to the designated time period.

Scenario example: by taking a train ticket activity card from East Hangzhou to Wuhan as an example, FIG. 9 to FIG. 12 show schematic diagrams of an example display of various services for a user in various time periods before and after an activity. In the figures, basic information of the activity card is unchanged, including a train number, stop information (a place of departure and a destination), departure date and time, passenger name, a validity period of the train number, and a seat number. Display of the service application in the activity card changes correspondingly over time, which provides convenience for the user.

Figure 9:
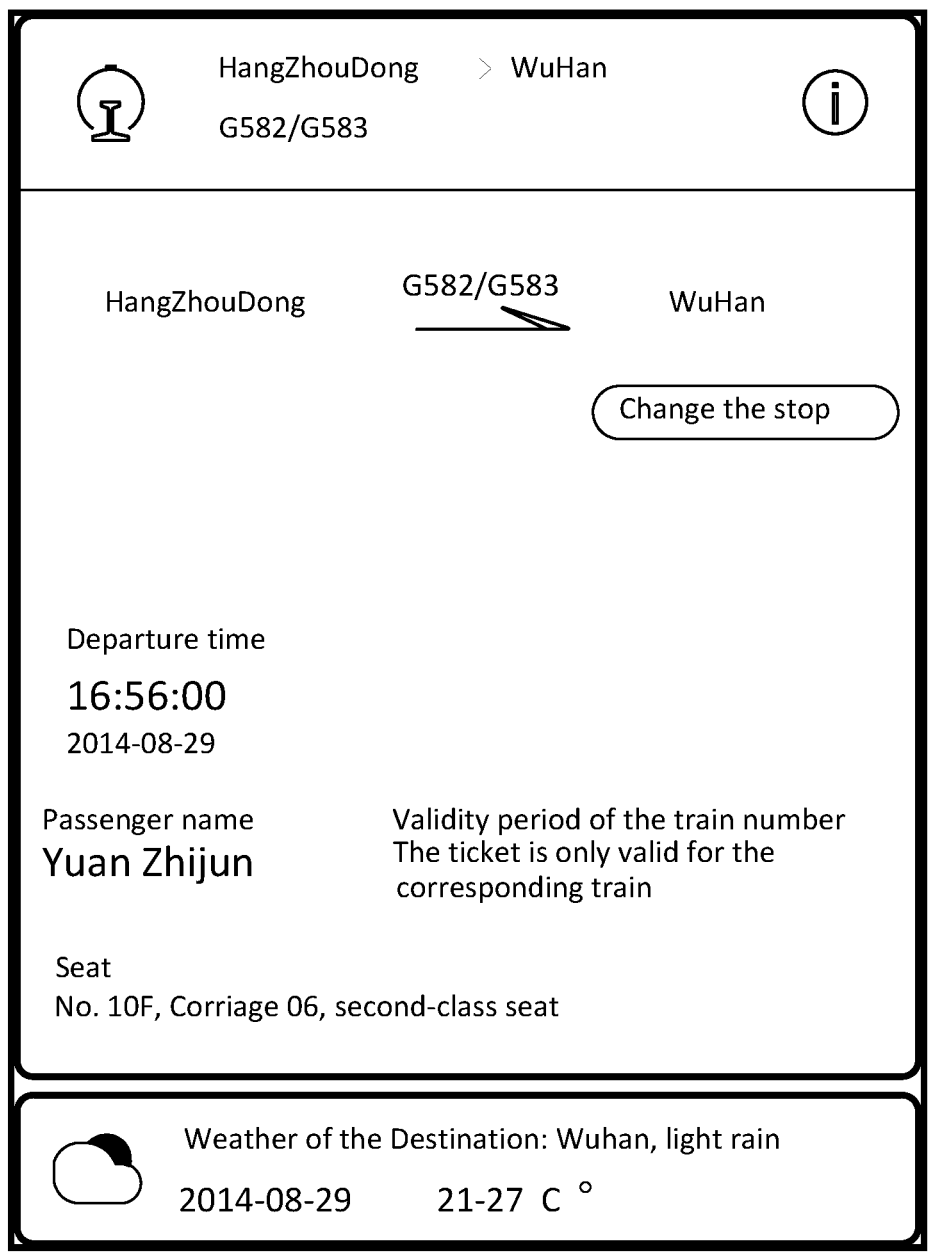
FIG. 9 is a schematic interface diagram of an example display of weather forecast of a destination in an example of the message including text content processing method according to the fifth embodiment of the present disclosure.
Figure 10:
FIG. 10 is a schematic interface diagram of an example display of a taxi and navigation service of arrival at a railway station in an example of the message including text content processing method according to the fifth embodiment of the present disclosure.
Figure 11:
FIG. 11 is a schematic interface diagram of an example display of a food and beverage service near a railway station in an example of the message including text content processing method according to the fifth embodiment of the present disclosure.
Figure 12:
FIG. 12 is a schematic interface diagram of an example display of an arrival reminding service and an offline music service in an example of the message including text content processing method according to the fifth embodiment of the present disclosure.

1) FIG. 9 illustrates a schematic interface diagram of an example display of destination weather forecast when there is 1 day before the train starts;

2) FIG. 10 illustrates a schematic interface diagram of an example display of a taxi and navigation service of arriving at a railway station when there is 3 hours before the train starts;

3) FIG. 11 illustrates a schematic interface diagram of an example display of a food and beverage service near a railway station when there is 1 hour before the train starts; and 4) FIG. 12 illustrates a schematic interface diagram of an example display of a stop reminding service and an offline music service after the train starts.

The methods of the present disclosure may all be implemented by means of software, hardware, firmware, or the like. No matter whether the present disclosure is implemented by means of software, hardware, or firmware, an instruction code may be stored in any type of computer accessible memory (e.g., permanent or modifiable, volatile or non-volatile, solid-state or non-solid-state, fixed or replaceable medium, and so on). Similarly, the memory may be, for example, a Programmable Array Logic (PLA), a Random Access Memory (RAM), a Programmable Read Only Memory (PROM), a Read-Only Memory (ROM), an Electrically Erasable Programmable ROM (EEPROM), a magnetic disk, an optical disc, a Digital Versatile Disc (DVD), and so on.

Figure 13:
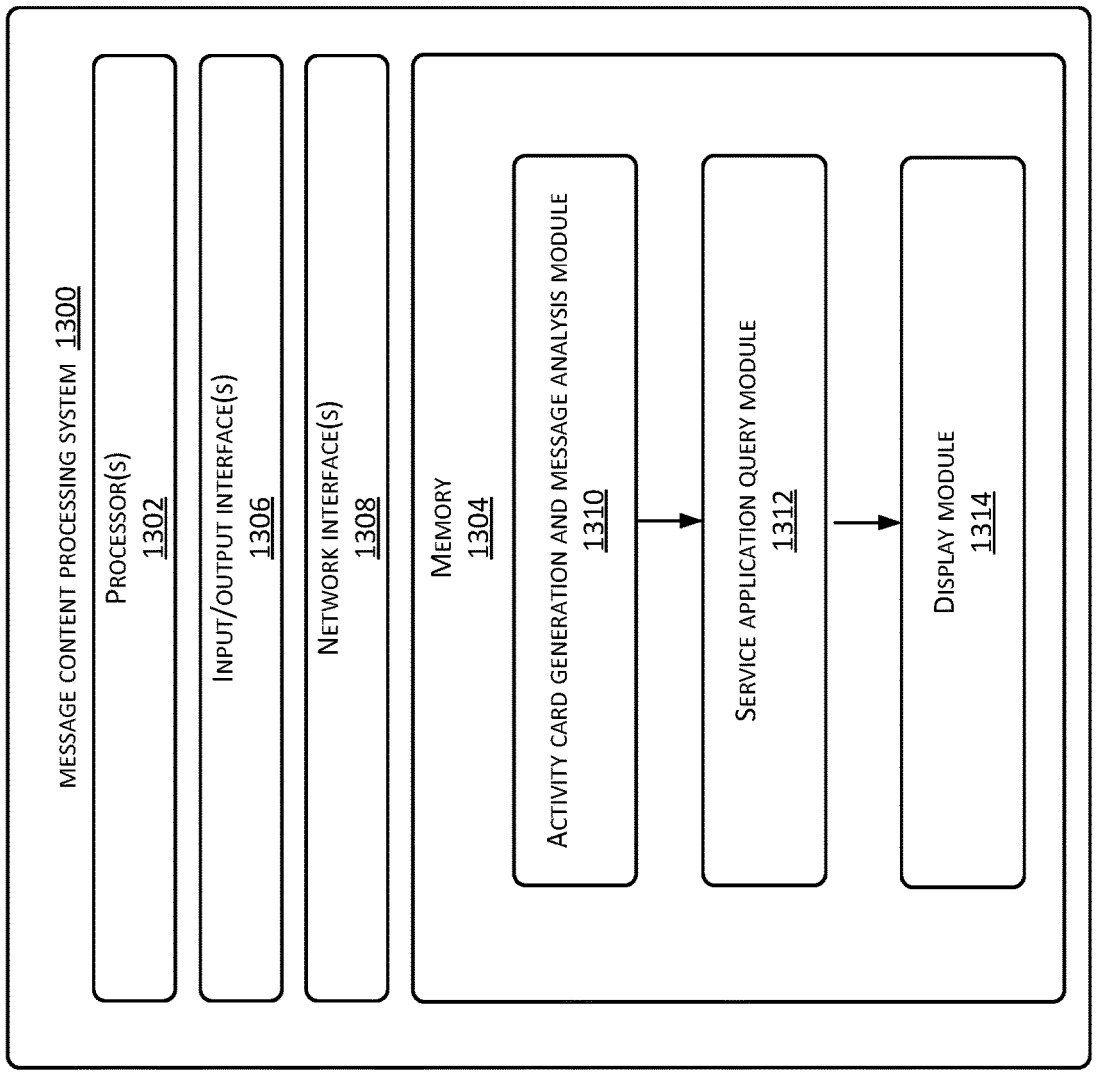
FIG. 13 is a schematic structural diagram of a message including text content processing system according to a sixth embodiment of the present disclosure.

A sixth embodiment of the present disclosure relates to a message including text content processing system. FIG. 13 is a schematic structural diagram of an example message processing system 1300. At least one activity matching template is pre-stored, each activity matching template includes an activity identification condition, an activity type, and a text analysis rule, a corresponding relationship between the activity type and an Internet-based service application is pre-stored. The message processing system 1300 includes one or more processor(s) 1302 or data processing unit(s) and memory 1304. The message processing system 1300 may further include one or more input/output interface(s) 1306, and network interface(s) 1308. The memory 1304 is an example of computer readable media.

The computer readable media include volatile and non-volatile, removable and non-removable media, and can use any method or technology to store information. The information may be a computer readable instruction, a data structure, and a module of a program or other data. Examples of storage media of a computer include, but are not limited to, a phase change memory (PRAM), a static random access memory (SRAM), a dynamic random access memory (DRAM), other types of RAMs, an ROM, an electrically erasable programmable read-only memory (EEPROM), a flash memory or other memory technologies, a compact disk read-only memory (CD-ROM), a digital versatile disc (DVD) or other optical storage, a cassette tape, a tape disk storage or other magnetic storage devices, or any other non-transmission media, which can be that storing information accessible to a computation device. According to the definition herein, the computer readable media does not include transitory computer readable media (transitory media), for example, a modulated data signal and a carrier.

The memory 1304 may store therein a plurality of modules or units including:

an activity card generation and message analysis module 1310 configured to determine whether the received message including text content meets the activity identification condition in one of the activity matching templates, and if yes, generate an activity card corresponding to the activity type in the activity matching template, and analyze the message including text content with the text analysis rule in the activity matching template, to fill information obtained through analysis into the activity card;

a service application query module 1312 configured to query the corresponding relationship according to the activity type of the activity card, to obtain a service application corresponding to the activity type; and a display module 1314 configured to display, when the activity card is displayed on the mobile terminal, the service application obtained through query.

For example, the source of the message including text content is not fixed. It may be understood that "the source of the message including text content is not fixed" in the present application refers to that the message including text content is not from one or more fixed sources, the source is a non-specific person, and it is likely to receive message including text contents from lots of senders (generally, it is impossible to predict which sender the next message including text content is from), for example, SMSs received by a cell phone may be from various numbers. The "source" referred to in the present application refers to an initial sender, which may be a server and may also be a mobile terminal, but does not refer to a network node or server that plays a role of transfer.

The "activity card" in the present application is a visual expression of an information set, but is not a substantial card, an activity card is a set of related information of a specific activity, and the set of related information may be displayed with a certain data format on an interface of the mobile terminal, for example, the activity card may include information such as an activity type, activity time, and an activity location.

The modules may be all disposed at the mobile terminal, may be all disposed at a server of a network side, and may also be that one part of the modules are disposed at a mobile terminal and the other part of the modules are disposed at a server of a network side.

In each embodiment of the present disclosure, a sequence between the step of generating an activity card corresponding to the activity type in the activity matching template and the step of analyzing the message including text content with the text analysis rule in the activity matching template is not particularly limited, it is possible to first generate an activity card, analyze the message including text content, and then fill information obtained through analysis into the activity card, and it is also possible to first analyze the message including text content and then directly generate an activity card by using information obtained through analysis.

The first embodiment is a process embodiment corresponding to this embodiment, and this embodiment may be implemented in conjunction with the first embodiment. Related technical details mentioned in the first embodiment are still effective in this embodiment, which are no longer repeated here in order to reduce repetition. Correspondingly, related technical details mentioned in this embodiment are also applicable to the first embodiment.

A seventh embodiment of the present disclosure relates to a message including text content processing system. The seventh embodiment makes improvements on the basis of the sixth embodiment, and the main improvements lie in: the service application is displayed according to a time axis before and after an activity takes place. This enables the user to, for example, see an associated service desired most in respective time periods before and after the activity; the manner based on a time axis is supplemented, and the service application is adjusted in combination with time and a geographical position, which is more in line with an actual situation and avoids inconvenience brought about to the user due to an error such as flight delay or train delay. Specifically:

The activity card includes a feature moment.

In an example, the corresponding relationship includes a corresponding relationship between the activity type, a display time period, and the Internet-based service application, wherein the display time period is a relative value relative to the feature moment of the activity card.

In the display module, the service application obtained through query is displayed according to a difference between a current moment and the feature moment in the activity card and a display time period of the service application in the corresponding relationship.

In addition, it may be understood that, for example, when each service application is displayed in a different time period according to the time axis, multiple service applications may be displayed at the same time in a certain time period, for example, service applications of taxi and navigation are displayed at the same time.

There may be one or more feature moments in the activity card, for example, start-up time of a train, departure and arrival time of a plane, starting time of a movie and so on.

Generally, if a difference falls within a certain display time period, each service application corresponding to the display time period may be displayed.

However, in an actual application, an example display of the service applications arranged only according to time still has certain limitations. For example, due to weather or other reasons, flight delay is often encountered in daily life, and in this scenario, if a service application is provided for a user still according to estimated departure time and estimated arrival time of a flight, for example, providing the user with a food and beverage service application of a destination within the estimated arrival time is not effective, what the user needs more may be a food and beverage service of a place of departure.

With respect to this situation, in addition to controlling sorting and display of the service applications according to time, it is also necessary to take position information of the user into account.

In an example, the corresponding relationship includes a corresponding relationship between the activity type, a display time period, a display region, and the Internet-based service application, wherein the display time period is a relative value relative to the feature moment of the activity card.

In the display module, the service application obtained through query is displayed according to a difference between a current moment and the feature moment in the activity card, a current position, and a display time period and a display region of the service application in the corresponding relationship.

In addition, it may be understood that, generally, if a difference falls within a certain display time period and the current position falls within a certain display region, service applications corresponding to the display time period and the display region may be displayed.

In embodiments of the present disclosure, some service applications in the corresponding relationship are only limited by the display region but not by the display time period (or may be displayed in all the time periods).

An eighth embodiment of the present disclosure relates to a message including text content processing system. The eighth embodiment makes improvements on the basis of the sixth embodiment, and the main improvements lie in: when a public number or content changes greatly, it is necessary to update the activity matching template, and the user does not need to manually update it as it is updated through an online update mechanism, and provides convenience for the user; for a situation where the number of message including text contents from a public number source is limited, in the present disclosure, a message including text content from a private number source is also analyzed to generate an activity card, and expands compatibility of the present disclosure. Specifically:

In daily life, message including text contents received by a user are mainly classified into two types: the first type is from a public number source (e.g., train ticket SMSs from 12306, which is a Chinese official website for ordering train tickets, credit card SMSs from banks, air ticket SMSs from Qunar or the like), and sending numbers of such SMSs are relatively fixed and sending content is relatively uniform. The second type is from a private number source (e.g., SMSs from relatives, friends, and colleagues), and such SMS numbers are varied and content is not uniform. With respect to the above two situations, the present application performs different processing respectively.

When the message including text content is from a public number source, the activity identification condition is number source information (that is to say, the activity type of the message including text content may be determined through the number source; if the sending number is 12306, it may be determined that the activity is relevant to a train ticket). In the activity card generation and message analysis module:

It is determined whether the message including text content from the public number source meets the number source information in one activity matching template, and if yes, an activity card corresponding to the activity type in the activity matching template is generated, and the message including text content is analyzed with the text analysis rule in the activity matching template, to fill information obtained through analysis into the activity card.

Although the message including text contents and content of the public number source are relatively uniform, it is necessary to update the activity matching template when a public number or content changes greatly, and if the user needs to manually update the activity matching template, it may cause large disturbance to the user. In an example, an activity matching template update module is further included, configured to update the activity matching template.

The activity matching template update module includes the following sub-modules:

an update query sub-module configured to send an update query request to a server terminal, use a locally buffered activity matching template if the request fails, and query whether an activity matching template resource of the server terminal is updated if the request is successful; and an update receiving sub-module configured to receive and buffer the latest activity matching template resource transmitted by the server terminal if the activity matching template resource of the server terminal is updated, and continue to use a locally buffered resource if the activity matching template resource of the server terminal is not updated.

The user does not need to manually update the activity matching template as it is updated through an online update mechanism, thus providing convenience.

When the message including text content is from a private number source, the activity identification condition includes time and/or location information (that is to say, if the message including text content from a private number source includes specific time and location, it indicates that a corresponding activity takes place in designated time and location, such as a meeting, and a dinner party).

In the activity card generation and message analysis module:

it is determined whether the message including text content from the private number source includes time and location information, and if yes, an activity card of a user-defined activity type is generated, and the message including text content is analyzed with a text analysis rule in a universal activity matching template, to fill information obtained through analysis into the activity card.

In addition, it may be understood that, if the message including text content includes specific time and location, it indicates that a corresponding activity takes place in designated time and location. The universal activity matching template is mainly used to analyze time and location in the message including text content from the private number source, extract them to make up an activity card, and let the user self-define an activity theme through interaction.

A ninth embodiment of the present disclosure relates to a message including text content processing system. The ninth embodiment makes improvements on the basis of the sixth embodiment, and the main improvements lie in: for a situation where information analyzed from the message including text content is insufficient, more perfect and more accurate data is acquired by querying a server corresponding to the activity type about supplementary information and by processing data of the activity card, thus providing a more accurate service for the user. Specifically:

In an example, the following module is further included:

a message including text content receiving module configured to receive the message including text content.

The message including text content receiving module includes the following sub-modules:

a broadcast monitoring sub-module configured to monitor a broadcast with message including text content automatically sent when an operating system receives a new message including text content; and a monitoring judgment sub-module configured to determine whether a broadcast is monitored, receive the message including text content if the broadcast is monitored; and continue the monitoring if the broadcast is not monitored.

In an example, the following modules are further included:

a supplementary information acquisition module configured to send information obtained through analysis to a server corresponding to the activity type, and receive activity card supplementary information returned by the server; and a data processing module configured to fill the activity card supplementary information and the information obtained through analysis together into the activity card, to perform data processing on the activity card.

In addition, it may be understood that, in the case of a train ticket activity card, a destination of a user may not be acquired from a message including text content, which only includes the user's place of departure and train number, and in this way, a more accurate service about the destination may not be provided for the user. In the case of a movie ticket activity card, only a movie title may be acquired from the message including text content, but a movie poster may not be acquired, which may not give the user a better visual experience.

For a situation where information obtained through analysis of the message including text content is insufficient, more perfect and more accurate data is acquired by querying a server corresponding to the activity type about supplementary information and by processing data of the activity card, thus providing a more accurate service for the user.

A tenth embodiment of the present disclosure relates to a message including text content processing system. The tenth embodiment makes improvements on the basis of the sixth embodiment, and the main improvements lie in: information in the activity card is sent to a server of a service application, the user no longer needs to manually input activity-related information into the service application, and a result provided by the service application may be seen directly while the activity card is displayed; when a client needs to obtain a result of a service application, information in the activity card is sent to a server of the service application, a result returned by the server of the service application is received, and when the client does not need the result, corresponding sending and receiving are not performed, thereby reducing unnecessary transmission volume. Specifically:

In an example, the following modules are further included:

a service result direct acquisition module configured to send, before the display module displays the service application, information in the activity card to a server of the service application, and receive a result returned by the server of the service application; and a service result direct display module configured to display, when the display module displays the service application, the result returned by the server of the service application on the mobile terminal.

In addition, it may be understood that an example of the service application may be an application of weather forecast of a destination, and a result provided by the service application is specific weather forecast of the destination.

For example, before an application of weather forecast of a destination of a train ticket is displayed, train number information of the train ticket is sent to a server of a weather service application, specific weather forecast of the destination returned by the server of the weather service application is received, and the specific weather forecast is displayed on a mobile terminal, therefore the user no longer needs to manually input activity-related information to the weather forecast application, and specific weather forecast may be seen directly while the activity card is displayed.

In an example, the following modules are further included:

a service result click acquisition module configured to send, when a button of the service application is clicked, the information in the activity card to the server of the service application, and receive the result returned by the server of the service application; and a service result click display module configured to display, after the service result click acquisition module acquires the result returned by the server of the service application, the result on the mobile terminal.

In the example manner, only a related service application is displayed, and the result returned by the server of the service application is not directly displayed. Only when the button of the service application is clicked (that is, when a client needs to obtain the result of the service application), may information in the activity card be sent to the server of the service application and the result returned by the server of the service application be received, to display the result on the mobile terminal; and when the client does not need the result, corresponding sending and receiving are not performed, thereby reducing unnecessary transmission volume.

The fifth embodiment is a process embodiment corresponding to this embodiment, and this embodiment may be implemented in conjunction with the fifth embodiment. Related technical details mentioned in the fifth embodiment are still effective in this embodiment, which are no longer repeated here in order to reduce repetition. Correspondingly, related technical details mentioned in this embodiment are also applicable to the fifth embodiment.

It should be noted that each unit mentioned in the device embodiment of the present disclosure is a logic unit. Physically, a logic unit may be a physical unit, may also be a part of a physical unit, and may be further implemented with a combination of a plurality of physical units. Physical implementation manners of the logic units per se are not most important, but a combination of functions implemented by the logic units is the key to solving the technical problem raised in the present disclosure. In addition, in order to highlight the innovative part of the present disclosure, each device embodiment of the present disclosure does not introduce units not closely related to the technical problem raised in the present disclosure, but this does not indicate that the device embodiment does not include other units.

It should be noted that, in the claims and specification of the present disclosure, the relational terms such as first and second are merely used to distinguish one entity or operation from another entity or operation, but may not necessarily require or imply that the entities or operations have any such an actual relation or order therebetween. Moreover, the terms "include" and "comprise" or any other variations intend to cover non-exclusive inclusion, so that processes, methods, articles or apparatuses including a series of elements not only include the elements, but also include other elements not explicitly listed, or also include inherent elements of the processes, methods, articles or apparatuses. In the absence of more limitations, the elements defined by the expression "including one . . . ," do not exclude that the processes, methods, articles or apparatuses including the elements also have other identical elements.

Although the present disclosure has been illustrated and described with reference to some example embodiments of the present disclosure, those of ordinary skill in the art should understand that various changes may be made to the present disclosure in the form and details without departing from the spirit and scope of the present disclosure.

What is claimed is:

1. A method comprising:
   determining that a message including text content meets an activity identification condition in an activity matching template;
   generating an activity card corresponding to an activity type in the activity matching template;
   analyzing the message according to a text analysis rule in the activity matching template;
   filling information obtained through analysis into the activity card;
   querying a corresponding relationship between the activity type and a service application according to the activity type to obtain the service application corresponding to the activity type; and
   displaying the activity card and the service application at a mobile terminal.

2. The method of claim 1, wherein:
   the activity matching template is pre-stored; and
   the corresponding relationship is pre-stored.

3. The method of claim 2, wherein:
   the corresponding relationship further includes a corresponding relationship between the activity type, the display time period, a display region, and the service application; and
   the displaying the activity card and the service application includes displaying the activity card and the service application according to a difference between a current moment and the feature moment in the activity card, a current position, display time period, and a display region of the service application in the corresponding relationship.

4. The method of claim 1, wherein:
   the activity card includes a feature moment;
   the corresponding relationship includes a corresponding relationship between the activity type, a display time period, and the service application, wherein the display time period is a relative value relative to the feature moment of the activity card; and
   the displaying the activity card and the service application includes displaying the activity card and the service application according to a difference between a current moment and the feature moment in the activity card and a display time period of the service application in the corresponding relationship.

5. The method of claim 1, wherein:
   when the message is from a public number source, the activity identification condition is number source information; and
   the determining that the message meets an activity identification condition in an activity matching template includes determining that the message from the public number source meets number source information in the activity matching template.

6. The method of claim 1, further comprising updating the activity matching template, the updating the activity matching template including:
   sending an update query request to a server terminal;
   using a locally buffered activity matching template in response to determining that the request fails, or querying whether an activity matching template resource of the server terminal is updated if the request is successful; and
   receiving and buffering a latest activity matching template resource transmitted by the server terminal in response to determining that the activity matching template resource of the server terminal is updated.

7. The method of claim 1, wherein:
   when the message is from a private number source, the activity identification condition includes time and/or location information; and
   the determining that the message meets the activity identification condition in an activity matching template includes determining that the message from the private number source includes the time and/or location information;
   the generating the activity card corresponding to the activity type in the activity matching template includes generating an activity card corresponding to a user-defined activity type in the activity matching template; and analyzing the message include analyzing the message according to the text analysis rule in a universal activity matching template.

8. The method of claim 7, wherein the analyzing the message according to the text analysis rule in the universal activity matching template includes:

extracting, by using a regular expression, geographical indication information comprised in the message;

performing a word segmentation through a lexicon of common geographical names in response to determining that the geographical indication information lacks a prefix of a first geographical indication; and using a maximum word segment adjacent to the first geographical indication as a prefix in response to determining that the word segmentation is successful or searching forward from the first geographical indication till a first non-Chinese character is searched in response to determining that the word segmentation fails.

9. The method of claim 7, wherein the analyzing the message according to the text analysis rule in the universal activity matching template includes:

unifying Chinese numerals and Arabic numerals as corresponding Arabic numerals through character replacement;

extracting a date through the regular expression, the date including an absolute date or a relative date; and extracting a specific time through the regular expression.

10. The method of claim 1, further comprising:

sending information obtained through analysis to a server corresponding to the activity type; and receiving activity card supplementary information returned by the server; and the filling information obtained through analysis into the activity card includes filling the activity card supplementary information and the information obtained through analysis together into the activity card.

11. The method of claim 1, further comprising:

sending information in the activity card to a server of the service application;

receiving a result returned by the server of the service application.

12. The method of claim 11, wherein the displaying the activity card and the service application at the mobile terminal includes displaying the result returned by the server of the service application on the mobile terminal.

13. The method of claim 1, further comprising:

receiving the message, the receiving the message including:

monitoring a broadcast with message content automatically sent when an operating system receives a new message; and receiving the message if the broadcast is monitored; or continuing the monitoring if the broadcast is not monitored.

14. The method of claim 1, wherein the source of the message is not immutable.

15. The method of claim 1, further comprising:

sending, when a button of the service application is clicked, the information in the activity card to the server of the service application, and receiving the result returned by the server of the service application, to display the result on the mobile terminal.

16. A system comprising:

one or more processors; and one or more memories stored thereon computer-executable instructions that, when executed by the one or more processors, cause the one or more processors to perform acts comprising:

determining that a message including text content meets an activity identification condition in an activity matching template;

generating an activity card corresponding to an activity type in the activity matching template;

analyzing the message according to a text analysis rule in the activity matching template; and filling information obtained through analysis into the activity card.

17. The system of claim 16, wherein the acts further comprise:

querying a corresponding relationship between the activity type and a service application according to the activity type to obtain the service application corresponding to the activity type.

18. The system of claim 17, wherein the acts further comprise:

displaying the activity card and the service application at a mobile terminal.

19. The system of claim 16, wherein:

the activity card includes a feature moment;

the corresponding relationship includes a corresponding relationship between the activity type, a display time period, and the service application, wherein the display time period is a relative value relative to the feature moment of the activity card; and the displaying the activity card and the service application includes displaying the activity card and the service application according to a difference between a current moment and the feature moment in the activity card and a display time period of the service application in the corresponding relationship.

20. One or more memories stored thereon computer-executable instructions that, when executed by one or more processors, cause the one or more processors to perform acts comprising:

determining that a message including text content meets an activity identification condition in an activity matching template;

generating an activity card corresponding to an activity type in the activity matching template;

analyzing the message according to a text analysis rule in the activity matching template; and filling information obtained through analysis into the activity card.

* * * * *